(12) United States Patent
DePue

(10) Patent No.: US 7,954,663 B2
(45) Date of Patent: Jun. 7, 2011

(54) VEHICLE CONSOLE

(75) Inventor: Todd L. DePue, Brighton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 440 days.

(21) Appl. No.: 12/151,861

(22) Filed: May 9, 2008

(65) Prior Publication Data

US 2009/0278370 A1 Nov. 12, 2009

(51) Int. Cl.
*B65D 43/20* (2006.01)
*B60R 13/00* (2006.01)
*B60J 9/00* (2006.01)

(52) U.S. Cl. ............... 220/813; 296/24.34; 296/153

(58) Field of Classification Search ......... 220/813, 220/812, 811, 810, 326, 324, 315, 254.5, 220/254.3, 254.1, 264, 263, 262, 260, 830, 220/827, 825, 23.89, 23.88, 23.87, 23.83; 296/24.34, 37.8, 153; 49/386, 254, 257, 49/258, 260; 224/542, 539; 16/354
See application file for complete search history.

(56) References Cited

U.S. PATENT DOCUMENTS

| | | |
|---|---|---|
| 6,000,572 A | 12/1999 | Kako et al. |
| 6,045,173 A | 4/2000 | Tiesler et al. |
| 6,419,314 B1 | 7/2002 | Scheerhorn |
| 6,719,367 B2 | 4/2004 | Mic et al. |
| 6,749,079 B2 | 6/2004 | Katagiri et al. |
| 6,932,402 B2 | 8/2005 | Niwa et al. |
| 7,004,527 B2 | 2/2006 | Niwa et al. |
| 7,234,746 B2 | 6/2007 | Sakakibara et al. |
| 2001/0020620 A1* | 9/2001 | Katagiri et al. ........... 220/345.2 |
| 2004/0140685 A1* | 7/2004 | Bieck et al. ................ 296/37.12 |
| 2005/0023280 A1* | 2/2005 | Kondo ........................ 220/263 |
| 2005/0146150 A1 | 7/2005 | Niwa et al. |
| 2006/0012202 A1 | 1/2006 | Sakakibara et al. |
| 2006/0166557 A1 | 7/2006 | Ishikawa et al. |
| 2008/0079278 A1* | 4/2008 | Rajappa et al. ............ 296/24.34 |
| 2009/0066103 A1 | 3/2009 | Koarai |
| 2009/0174236 A1* | 7/2009 | Lota et al. ................ 297/188.19 |

FOREIGN PATENT DOCUMENTS

EP 1 431 108 A 6/2004
FR 2848510 A1 * 6/2004

OTHER PUBLICATIONS

European Search Report, Application No./Patent No. 09003615.3-1264, Dated Feb. 11, 2009.

* cited by examiner

*Primary Examiner* — Anthony Stashick
*Assistant Examiner* — Robert J Hicks
(74) *Attorney, Agent, or Firm* — MacMillan, Sobanski & Todd, LLC

(57) ABSTRACT

A console assembly for a vehicle includes a console body defining an opening communicating with a storage bin. The storage bin has opposing side walls each having a groove formed therein. A sliding member is slidably mounted within the grooves of each of the side walls within the storage bin. A console cover is pivotally mounted to the sliding member and defines a cover assembly. The cover assembly is slidably movable between a closed position wherein the console cover covers the opening of the console body and a partially open position wherein a portion of the opening of the console body is exposed. The console cover is pivotally movable between the partially open position and a fully open position wherein the console opening and the sliding member are exposed. The console cover includes at least one follower extending outwardly therefrom, wherein the follower is slidably mounted within the grooves in the storage bin wall.

20 Claims, 4 Drawing Sheets

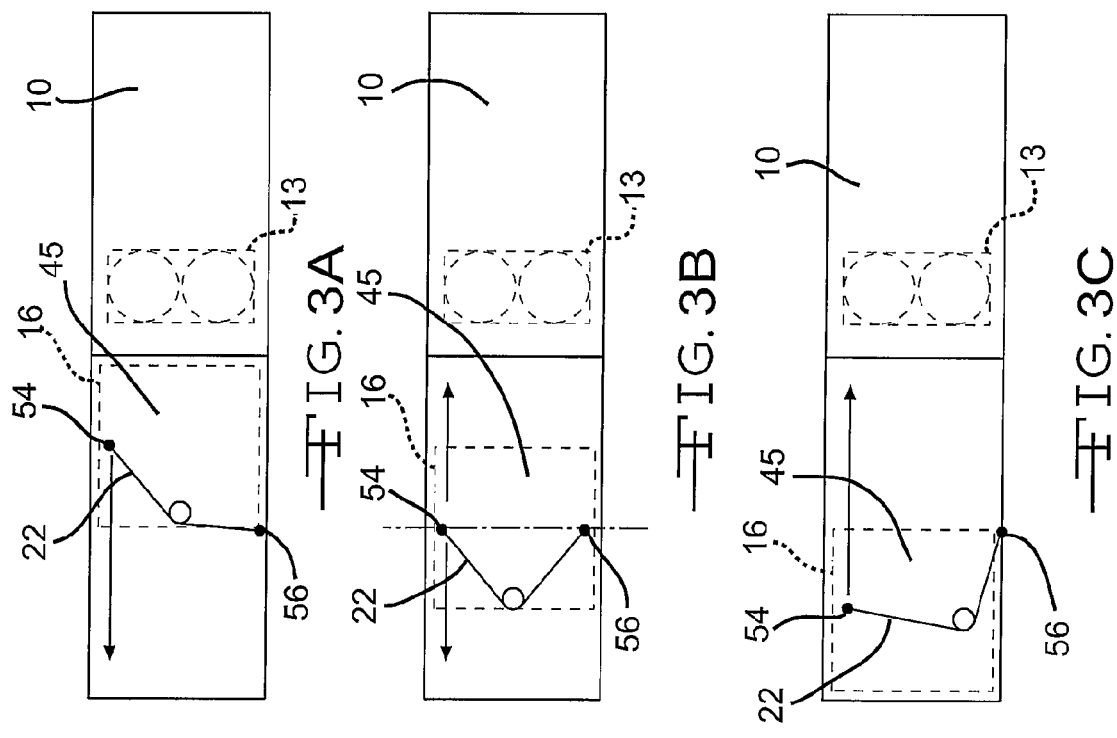
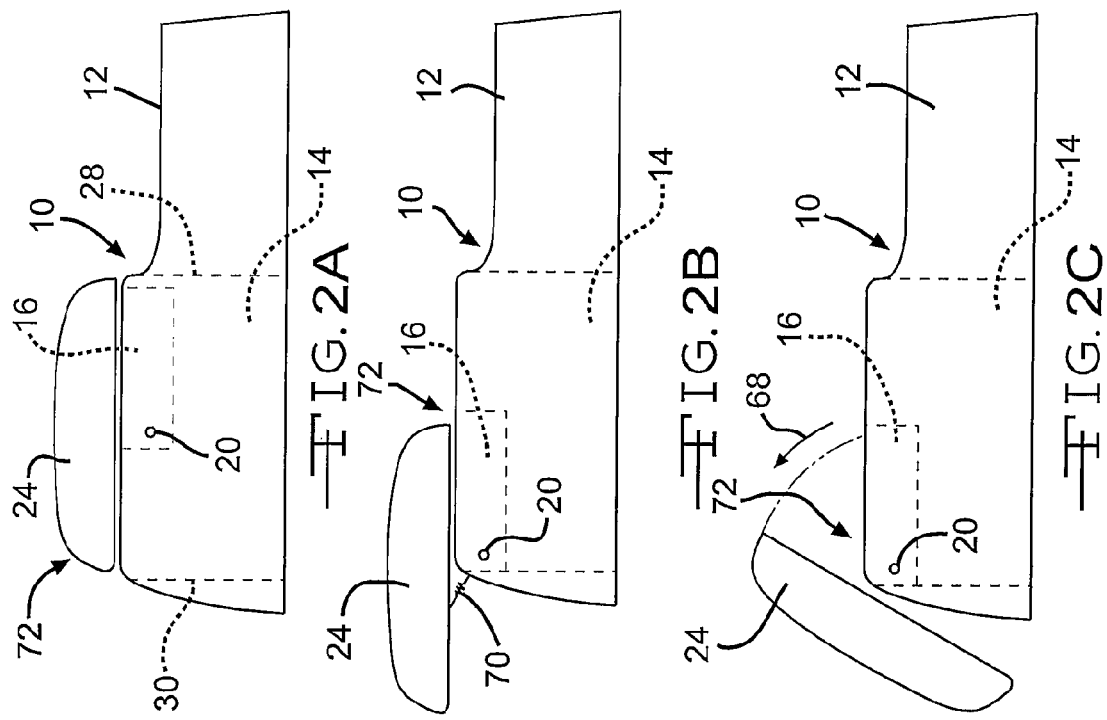

VEHICLE CONSOLE

BACKGROUND

Various embodiments of a vehicle console assembly are described herein. In particular, the embodiments described herein relate to an improved cover for a vehicle console assembly.

It is known to provide in automotive vehicles a console located between bucket-type seats for the storage of objects or to provide a cup holder. The covers for such consoles commonly tilt rearwardly or to one side to uncover a storage recess.

One example of such a known console is disclosed in U.S. Pat. No. 6,045,173, wherein a cover 20 is mounted to a sliding U-shaped slide and hinge mechanism 56, 18. The slide 56 has retainers extending downwardly into slots 48 in a portion 16 of the console body 12. The slide 56 with attached cover 20 must be pushed by an operator between open and closed positions, and frictionally engages the portion 16 of the console body as it is caused to slide along the portion 16 of the console body. The cover 20 is not connected to the console body 12 or bin 14 when moving from the closed position to the partially open position A.

Another example of a known console is disclosed in U.S. Pat. No. 7,234,746, wherein the lid 14 is slidably mounted to a panel 22. The panel 22 pivots, but does not slide relative to the console box 12. Guide pins 19 remain within the grooves 17 during all phases of movement of the lid 14.

SUMMARY

The present application describes various embodiments of a console assembly for a vehicle. One embodiment of the console assembly includes a console body having a first end defining an opening communicating with a storage bin. The storage bin has opposing side walls each having a groove formed therein. A sliding member is slidably mounted within the storage bin. A console cover is pivotally mounted to the sliding member and defines a cover assembly. The cover assembly is slidably movable between a closed position wherein the console cover covers the opening of the console body and a partially open position wherein a portion of the opening of the console body is exposed. The cover is pivotally movable between the partially open position and a fully open position wherein the console opening and the sliding member are exposed. The cover includes at least one boss extending outwardly therefrom, wherein the boss is slidably mounted within the groove in the storage bin wall.

Other advantages of the cover for a vehicle console assembly will become apparent to those skilled in the art from the following detailed description, when read in light of the accompanying drawings.

BRIEF DESCRIPTION OF THE DRAWINGS

FIG. 2A is a schematic elevational view of the console assembly illustrated in FIG. 1, showing the console cover assembly in the closed position.

FIG. 2B is a schematic elevational view of the console assembly illustrated in FIG. 1, showing the console cover assembly in the partially open position.

FIG. 2C is a schematic elevational view of the console assembly illustrated in FIG. 1, showing the console cover assembly in the fully open position.

FIG. 3A is a schematic top plan view of a portion of the console assembly illustrated in FIG. 1, showing the drawer in the first drawer position.

FIG. 3B is a schematic top plan view of a portion of the console assembly illustrated in FIG. 1, showing the drawer and spring in the over-center position of the spring.

FIG. 3C is a schematic top plan view of a portion of the console assembly illustrated in FIG. 1, showing the drawer in the second drawer position.

DETAILED DESCRIPTION

Figure 1:
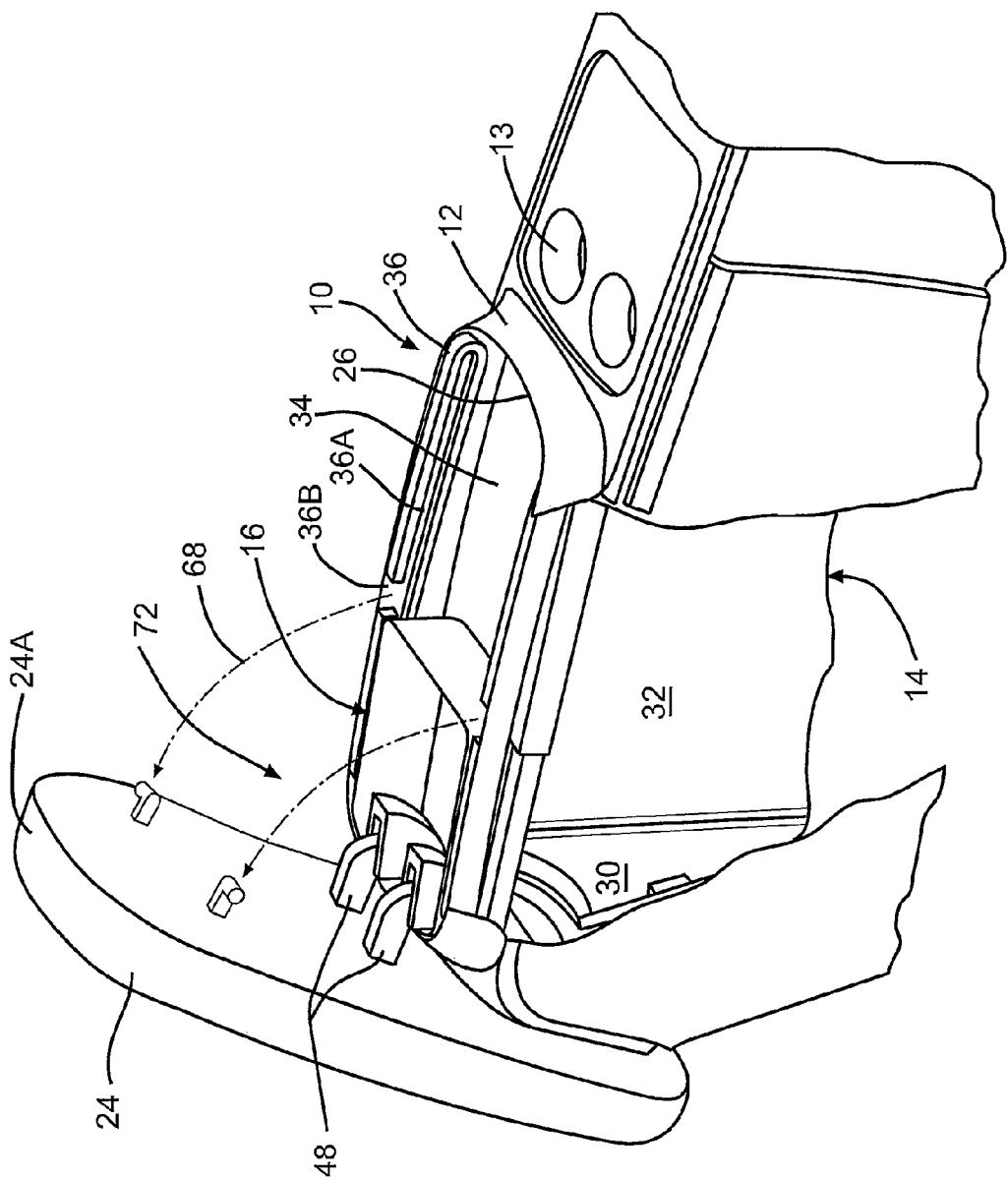
FIG. 1 is a perspective view of a portion of a first embodiment of the vehicle console assembly, showing the console cover assembly in the fully open position.

Referring now to the drawings, there is illustrated in FIGS. 1 and 3, an interior trim component or center floor console assembly, indicated generally at 10. The interior trim component 10 is an example of a console assembly for mounting in an interior cabin of a vehicle. It will be appreciated however, that the vehicle console assembly 10 of the subject invention may be any type of trim component or trim component assembly associated with a vehicle. Other suitable examples of trim component assemblies include instrument panels, door panels, overhead consoles, floor structures, armrest assemblies, and other various interior components for mounting within the vehicle.

FIGS. 1 through 4, inclusive, illustrate a first embodiment of the console assembly 10. As shown in FIGS. 1 and 2, the console assembly 10 includes a body or interior vehicle trim panel 12, a bin structure 14, a drawer 16, drawer slides 18, a pivoting member 20, a biasing member 22, and a cover 24.

In the exemplary embodiment illustrated in FIG. 1, the interior vehicle trim panel 12 is a console body 12 for mounting in an interior cabin of a vehicle, such as between the between the seats of an automobile, a boat, or an airplane. It will be appreciated however, that the console body 12 of the subject invention may be any type of interior trim panel associated with a vehicle, and can be located at any desired position in the vehicle. The console body 12 can be attached to the vehicle by any desired means, such as threaded fasteners, rivets, or with adhesive. The illustrated bin structure 14 includes cup holders 13. It will be understood however, that the cup holders 13 are not required.

The console body 12 is structured and configured to be mounted in a convenient location adjacent a vehicle seat, such as on the interior vehicle floor between spaced-apart front bucket seats. The illustrated console body 12 may be formed as a molded outer housing or enclosure having an upper edge defining an upwardly facing opening 26.

In the embodiment illustrated in FIG. 1, the bin structure 14, only a portion of which is shown in FIG. 1, includes a front wall 28, a rear wall 30, and side walls 32, defining an upwardly facing opening bin or receptacle 34. The bin structure 14 may be installed within the console body 12 through an open bottom (not shown) such that a portion of the bin structure 14 engages a portion of the console body 12. Alternatively, the bin structure 14 may be installed within the console body 12 through the opening 26 of the console body 12. The bin structure 14 may be attached to the console body 12 by any desired means, such as with through-fasteners (not shown), adhesive, or by welding.

It will be understood that the console body 12 and the bin structure 14 may be formed together. It will be further understood that the console body 12 and the bin structure 14 may be formed from any desired substantially rigid material, such as plastic. Materials such as polypropylene, nylon, acrylonitrile butadiene styrene (ABS), and polycarbonate acrylonitrile butadiene styrene (PCABS) may be used for the console body 12 and the bin structure 14 because of their strength and rigidity.

Figure 4:
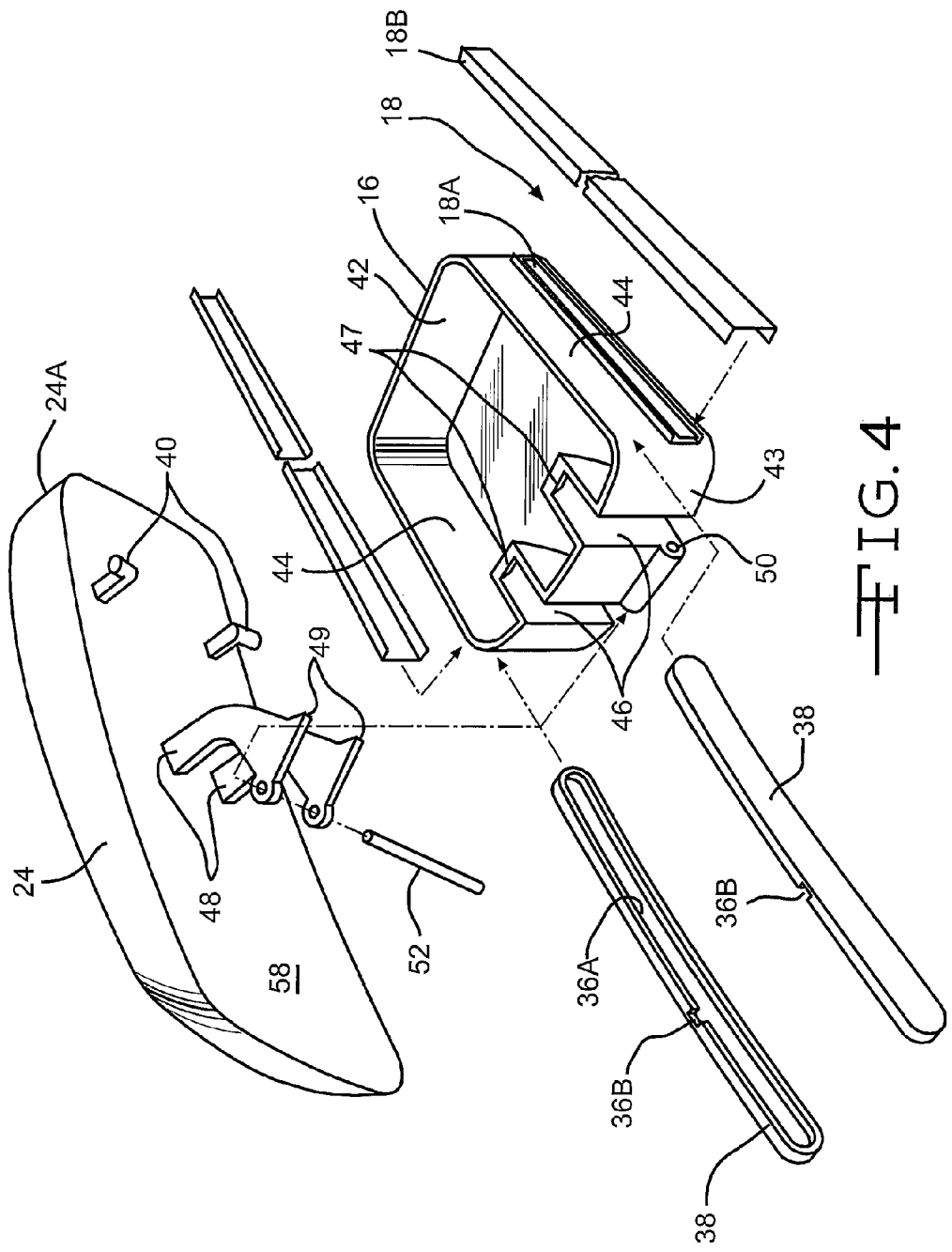
FIG. 4 is an enlarged exploded view of the drawer, cover, and tracks illustrated in FIG. 1.

Follower tracks 36 may be formed in an upper portion of opposing side walls 32 of the bin structure 14. As best shown in FIG. 4, the tracks 36 include a first track portion 36A extending rearwardly from the front wall 28 toward the rear wall 30 and substantially parallel to the upper edge of the bin structure 14. A second track portion 36B of the follower track 36 extends upwardly, substantially perpendicular to the first track portion 36A. In the illustrated embodiment, the follower tracks 36 are formed in a follower track structure 38 and attached to the upper portion of opposing side walls 32 of the bin structure 14. The follower track structures 38 may be attached to the bin structure 14 by any desired means, such as with through-fasteners (not shown), adhesive, or by welding. The follower tracks 36 are structured and configured to receive a follower 40 attached to the cover 24 as will be described in detail below.

A first embodiment of the drawer 16 is illustrated in FIG. 4. The drawer 16 includes a front wall 42, a rear wall 43, side walls 44, and a bottom wall 45. The drawer 16 may be attached to the bin structure 14 by drawer slides 18 for forward and rearward movement of the drawer 16. In the illustrated embodiment, the drawer slides 18 are ball bearing drawer slides such as available from Accuride® International, Inc. of California. The illustrated drawer slide 18 is an assembly including a first slide member 18A and a second slide member 18B. The first slide member 18A is attached to an outside surface of the side walls 44 of the drawer 16. The second slide members 18B are attached to an upper portion of opposing side walls 32 of the bin structure 14.

Figure 5:
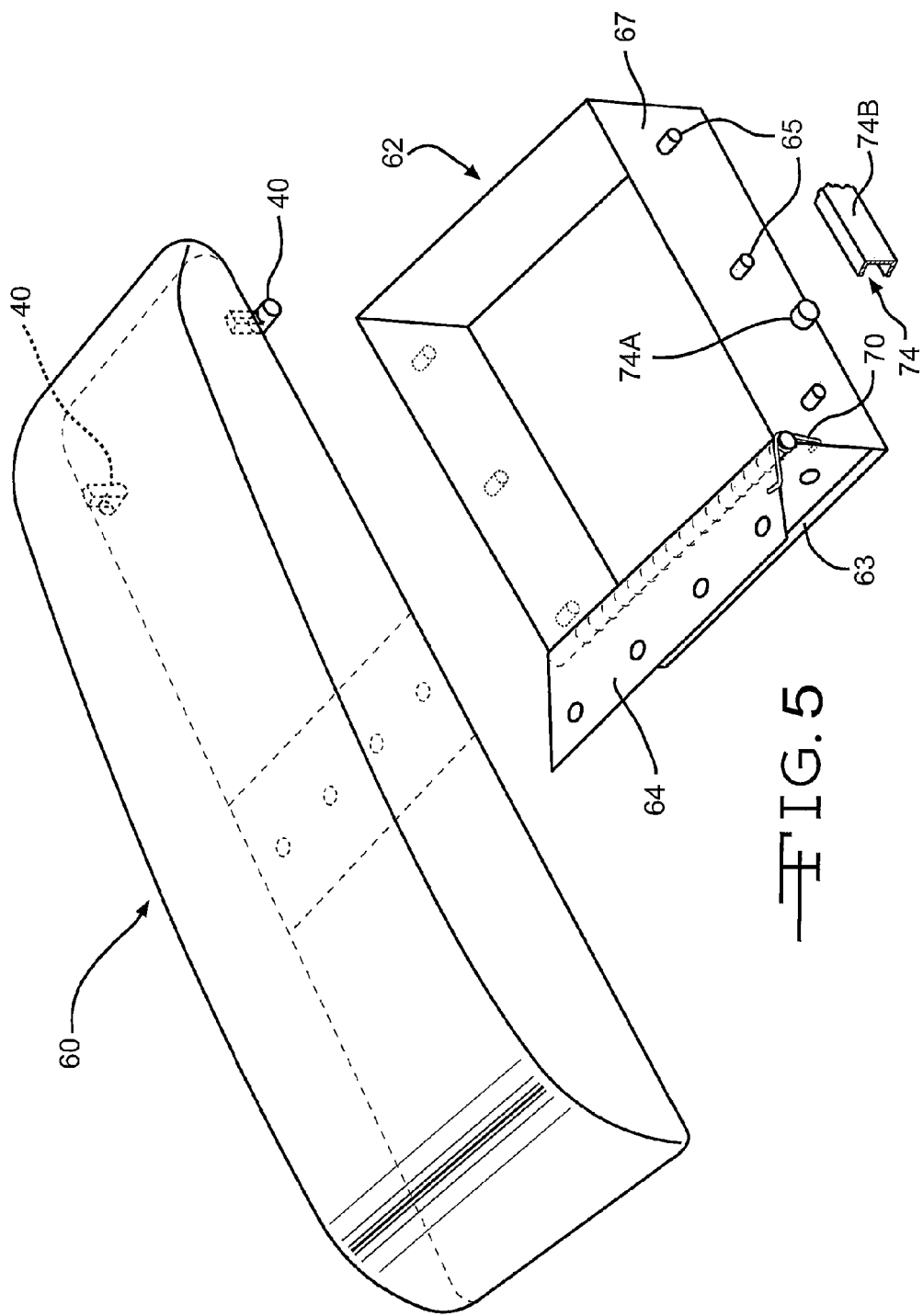
FIG. 5 is a perspective view of a second embodiment of the drawer and cover illustrated in FIGS. 1 and 4.

Alternatively, as best shown in FIG. 5, the drawer 62, which will be described in detail below, may include outwardly extending bosses 65. The illustrated bosses 65 are structured and configured for sliding engagement within the first track portion 36A.

Recesses 46 are formed in the rear wall 43 and portion of the bottom wall 45 for receiving pivot arms 48 of the cover 24, described in detail below. A groove or bore 50 for receiving a pivot pin 52 is also formed in the rear wall 43.

As best shown in FIGS. 3A through 3C, a biasing member 22 is mounted below the bottom wall 45 of the drawer 16. In the illustrated embodiment, the biasing member 22 is an over-center type spring. The spring 22 is substantially V-shaped and includes a first end 54 and a second end 56. The first end 54 is attached to the bottom wall 45 of the drawer 16 intermediate the front wall 42 and the rear wall 43. The second end 56 of the spring 22 is attached to a side wall 32 of the bin structure 14.

The rear wall 43 of the drawer 16 is attached to the cover 24 by a pivoting member 20. The illustrated pivoting member 20 includes a pair of pivot arms 48 extending downwardly from bottom surface 58 of the cover 24. A pivot pin 52 extends between the pivot arms 48. The pivot arms 48 are disposed in the recesses 46 of the drawer 16 and the pivot pin 52 is structured and configured to be pivotally mounted within the groove 50 formed in the rear wall 43. When attached together, the drawer 16 and the cover 24 define a cover assembly 72. The illustrated pivot arms 48 include a stop portion 49 at a distal end (lower end when viewing FIG. 4) thereof. The stop portions 49 are structured and configured to engage a lip portion 47 formed at a forward end of the recesses 46 to limit pivoting movement of the cover 24.

As best shown in FIG. 2B, a spring 70 may be provided between the drawer 16 and the cover 24 to urge the cover 24 from the partially open position to the fully open position. The spring 70 is schematically illustrated in FIG. 2B and it will be understood that any desired type of spring or other biasing member, such as an elastomeric member, may be used.

Alternative embodiments of the cover and the drawer are shown generally at 60 and 62, respectively, in FIG. 5. The drawer 62 is substantially identical to the drawer 16; however, the rear wall 63 does not include recesses. In the illustrated embodiment, the cover 60 is attached to the drawer 62 by a pivoting member 64. As shown in FIG. 5, the pivoting member 64 is a spring biased piano-type hinge, but it will be understood that any desired type of hinge may be used. For example, the hinge 64 need not be spring biased. The hinge 64 may be attached to the drawer 62 by any desired method, such as threaded fasteners, rivets, adhesive, or welding.

Referring now to FIGS. 2 and 3, the drawer 16 having the spring 22 may be easily moved between a first drawer position as shown in FIGS. 3A and 4A, a second drawer position, as shown in FIGS. 3C and 4C. As will be described in detail below, the first drawer position corresponds to the closed position of the cover 24. The second drawer position corresponds to both the partially open and fully open positions of the cover 24.

The cover 24 may be formed by any known method, such as with a relatively rigid substrate and a plastic foam core surrounded by a decorative flexible trim cover or skin 66. The pivoting member 20 may be attached to the cover 24 by any desired method, such as threaded fasteners, rivets, adhesive, or welding. A pair of followers 40 extends outwardly from a bottom surface 58 of the cover 24. The illustrated followers 40 are substantially L-shaped in cross-section and are structured and configured to be slidably received within the follower tracks 36. Alternatively, the followers may have any desired shape structured and configured to sliding engagement within the follower tracks 36.

The cover 24, 60 may include a latch (not shown) for releasable engagement with the console assembly 10. Such a latch may be provided at any desired position on the cover 24, 60, such as at a forward end 24A. Alternatively, the followers 40 may be spring biased and function as latch for releasable engagement with the console assembly 10.

In use, the cover 24 may function as an armrest and is positioned in a forward or closed position as shown in FIG. 2A. In the closed position, the console cover 24 covers the receptacle 34 of the bin structure 14. When it is desired to gain access to the receptacle 34, the cover 24 may be moved rearwardly to the partially open position as shown in FIG. 3B. In the partially open position, a portion of the receptacle 34 is exposed, providing access to the objects therein.

Referring now to FIG. 3, a vehicle occupant may manually apply a force on the cover 24 in the direction of the second drawer position, as shown in FIG. 3C (as described herein above, the second drawer position corresponds to the partially open and fully open positions as shown in FIGS. 2B and 2C, respectively), and through an over-center position of the spring 22, as indicated by the reference numeral 22B in FIG. 3B. Once the movement of the drawer 16 has caused the spring 22 to move past the over-center position 22B, the spring 22 then urges the drawer 16 to the second drawer position, as shown in FIGS. 2B, 2C, and 3C.

In the over-center position 22B, the spring 22 is in its most compressed position (i.e. wherein the distance between the first end 54 and the second end 56 of the spring is the shortest). Once the drawer 16 moves past the over-center position 22B of the spring 22, the spring 22 then urges the drawer 16 to the second drawer position without further manual urging by the vehicle occupant.

Similarly, when it is desired to move the cover assembly 72 in the direction of the first drawer position (and the closed position as shown in FIG. 4A), a force may again be applied by a vehicle occupant in the direction of the first drawer position. Once the drawer 16 is moved such that the spring 22 is moved past the over-center position 22B, the spring 22 again urges the drawer 16 to the first drawer position without further manual urging by the vehicle occupant.

Referring now to FIGS. 1 and 2, when the cover 24 is caused to move from the closed position as shown in FIG. 2A to the partially open position as shown in FIG. 2B, the followers 40 slide along the follower tracks 36 until the followers 40 reach the second portion 36B of the follower tracks 36. Once the followers 40 are positioned at the second portion 36B of the follower tracks 36, the cover 24 may be rotated to the fully open position, as shown in FIG. 2C. For example, when it is desired to expose the drawer 16 and gain access to the objects therein, the cover 24 may be rotated upwardly and rearwardly in the direction of the arrow 68 to the fully open position, as shown in FIG. 2C.

When the followers 40 are in the follower tracks 36, the vehicle occupant is prevented from rotating the cover 24 rearwardly and upwardly, and therefore prevented from damaging the cover 24 and pivoting member 20 before the drawer 16 and pivoting member 20 have been moved to the rearwardmost position (i.e., the second drawer position, as shown in FIGS. 2B and 3B).

When the console assembly 10 is provided with a spring biased pivoting member 20, as shown in FIG. 2B, the spring biased pivoting member 20 will urge the cover 24 from the partially open position to the fully open position when the followers 40 reach the second portion 36B of the follower tracks 36.

If desired, the cover assembly 72 may include a dampener, shown schematically at 74 in FIG. 5. The dampener 74 provides smooth forward and rearward movement of the drawer 62 between the first and second drawer positions, and prevents the drawer 62 from moving too forcefully and rapidly. Although only one dampener 74 is illustrated, it will be understood that any desired number of dampener 74 may be provided.

The illustrated dampener 74 includes a first member 74A attached to an outside surface of a side wall 67 of the drawer 62. A second member 74B is attached to an upper portion of a side wall 32 of the bin structure 14. Any desired type of dampener may be used. For example, a viscous rotary dampener such as manufactured by ITW Automotive Products, may be used. Drawer movement may also be dampened by friction, such as between the bosses 65 and the first track portion 36A. Alternatively, the bosses 65 may be spring biased to urge the bosses 65 into frictional engagement with the first track portion 36A.

The principle and mode of operation of the console assembly have been described in its preferred embodiment. However, it should be noted that the console assembly described herein may be practiced otherwise than as specifically illustrated and described without departing from its scope.

What is claimed is:

1. A console assembly for a vehicle, the console comprising:
    a console body defining an opening communicating with a storage bin, the storage bin having opposing side walls, each of the side walls having a groove formed therein;
    a sliding member slidably mounted within the grooves of each of the side walls within the storage bin; and
    a console cover pivotally mounted to the sliding member, the sliding member and console cover defining a cover assembly, the cover assembly slidably movable between a closed position wherein the console cover covers the opening of the console body and a partially open position wherein a portion of the opening of the console body is exposed, the console cover pivotally movable between the partially open position and a fully open position wherein the console opening and the sliding member are exposed;
    wherein the console cover includes at least one follower extending outwardly therefrom, the follower slidably mounted within the grooves in the storage bin walls.

2. The console assembly for a vehicle according to claim 1, wherein the console assembly further includes a biasing member mounted between the console body and the sliding member, the biasing member urging the console cover into one of the closed position and the partially open position.

3. The console assembly for a vehicle according to claim 2, wherein the biasing member is a spring.

4. The console assembly for a vehicle according to claim 3, wherein the spring is an over-center spring.

5. The console assembly for a vehicle according to claim 4, wherein such that when a manual force is applied to the cover assembly to urge the sliding member past an over-center spring position from one of the closed position and the partially open position, the over-center spring urges the sliding member to the other of the partially open position and the closed position; and
    wherein when the applied manual force is removed prior to the sliding member being moved to the over-center spring position from one of the closed position and the partially open position, the over-center spring urges the sliding member back to the one of the closed position and the partially open position from which the manual force was applied.

6. The console assembly for a vehicle according to claim 1, wherein the console cover is pivotally mounted to the sliding member intermediate a first end and a second end of the console cover.

7. The console assembly for a vehicle according to claim 5, further including a second biasing member, the second biasing member mounted between the console cover and the sliding member and urging the console cover from the partially open position to the fully open position.

8. The console assembly for a vehicle according to claim 1, wherein the follower is structured and configured for sliding engagement within the groove when the console cover is moved between one of the closed position and the partially open position and the other of the partially open position and the closed position, wherein the follower is removed from the groove when the console cover is pivotally moved between the partially open position and the fully open position, and wherein the follower is moved into sliding engagement with the groove when the console cover is pivotally moved between the fully open position and the partially open position.

9. A console assembly for a vehicle, the console comprising:
    a console body having a first end defining an opening communicating with a storage bin, the storage bin having opposing side walls;

a drawer slidably mounted within the storage bin; and a console cover pivotally mounted to the drawer, the drawer and console cover defining a cover assembly, the cover assembly slidably movable between a closed position wherein the console cover covers the opening of the console body and a partially open position wherein a portion of the opening of the console body is exposed, the cover pivotally movable between the partially open position and a fully open position wherein the console opening and the drawer are exposed;

wherein the console assembly further includes a biasing member mounted between the console body and the drawer, the biasing member urging the console cover into one of the closed position and the partially open position.

10. The console assembly for a vehicle according to claim 9, wherein the biasing member is a spring.

11. The console assembly for a vehicle according to claim 10, wherein the spring is an over-center spring.

12. The console assembly for a vehicle according to claim 11, wherein such that when a manual force is applied to the cover assembly to urge the drawer past an over-center spring position from one of the closed position and the partially open position, the over-center spring urges the drawer to the other of the partially open position and the closed position; and wherein when the applied manual force is removed prior to the drawer being moved to the over-center spring position from one of the closed position and the partially open position, the over-center spring urges the drawer back to the one of the closed position and the partially open position from which the manual force was applied.

13. The console assembly for a vehicle according to claim 9, wherein the console cover is pivotally mounted to the drawer intermediate a first end and a second end of the console cover.

14. The console assembly for a vehicle according to claim 13, further including a second biasing member, the second biasing member mounted between the console cover and the drawer and urging the console cover from the partially open position to the fully open position.

15. The console assembly for a vehicle according to claim 9, wherein the side walls have a groove formed therein, and wherein the cover includes at least one follower extending outwardly therefrom, the follower slidably mounted within the groove in the storage bin wall.

16. The console assembly for a vehicle according to claim 15, wherein the follower is structured and configured for sliding engagement within the groove when the console cover is moved between one of the closed position and the partially open position and the other of the partially open position and the closed position, wherein the follower is removed from the groove when the console cover is pivotally moved between the partially open position and the fully open position, and wherein the follower is moved into sliding engagement with the groove when the console cover is pivotally moved between the fully open position and the partially open position.

17. A console assembly for a vehicle, the console comprising:

a console body having a first end defining an opening communicating with a storage bin;

a sliding member slidably mounted within the storage bin;

a console cover pivotally mounted to the sliding member, the sliding member and console cover defining a cover assembly, the cover assembly slidably movable between a closed position wherein the console cover covers the opening of the console body and a partially open position wherein a portion of the opening of the console body is exposed, the cover pivotally movable between the partially open position and a fully open position wherein the console opening and the sliding member are exposed; and an over-center spring mounted between the console body and the sliding member, such that when a manual force is applied to urge the sliding member past an over-center spring position from one of the closed position and the fully open position, the over-center spring urges the sliding member to the other of the fully open position and the closed position;

wherein when the applied manual force is removed prior to the sliding member being moved to the over-center spring position from one of the closed position and the partially open position, the over-center spring urges the sliding member back to the one of the closed position and the fully open position from which the manual force was applied.

18. The console assembly for a vehicle according to claim 17, wherein the sliding member is a drawer.

19. The console assembly for a vehicle according to claim 18, wherein the console cover is pivotally mounted to the drawer intermediate a first end and a second end of the console cover.

20. The console assembly for a vehicle according to claim 19, further including a second biasing member, the second biasing member mounted between the console cover and the drawer and urging the console cover from the partially open position to the fully open position.

\* \* \* \* \*